United States Patent
Wang et al.

(10) Patent No.: US 9,146,900 B2
(45) Date of Patent: Sep. 29, 2015

(54) METHOD FOR ACTIVATING APPLICATION, HANDHELD ELECTRONIC APPARATUS AND CAR SYSTEM

(71) Applicant: HTC Corporation, Taoyuan County (TW)

(72) Inventors: John C. Wang, Taoyuan County (TW); Chi-Chen Cheng, Taoyuan County (TW); Peter Chin, Bellevue, WA (US)

(73) Assignee: HTC Corporation, Taoyuan (TW)

( * ) Notice: Subject to any disclaimer, the term of this patent is extended or adjusted under 35 U.S.C. 154(b) by 167 days.

(21) Appl. No.: 13/772,347

(22) Filed: Feb. 21, 2013

(65) Prior Publication Data

US 2013/0226401 A1    Aug. 29, 2013

Related U.S. Application Data

(60) Provisional application No. 61/601,542, filed on Feb. 21, 2012.

(51) Int. Cl.
*G06F 17/00* (2006.01)
*G06F 17/30* (2006.01)
*G01C 21/36* (2006.01)
*H04M 1/725* (2006.01)

(52) U.S. Cl.
CPC .......... *G06F 17/00* (2013.01); *G01C 21/3688* (2013.01); *G06F 17/3074* (2013.01); *G06F 17/30749* (2013.01); *H04M 1/7253* (2013.01); *H04M 2250/02* (2013.01); *H04M 2250/10* (2013.01)

(58) Field of Classification Search
CPC ................ G06F 17/00; G06F 17/3074; G06F 17/30749; G01C 1/3688; H04M 1/7253; H04M 2250/02; H04M 2250/10
See application file for complete search history.

(56) References Cited

U.S. PATENT DOCUMENTS

| | | | | |
|---|---|---|---|---|
| 5,712,899 A * | 1/1998 | Pace, II | ...... | 455/456.2 |
| 6,147,598 A * | 11/2000 | Murphy et al. | ...... | 340/426.19 |
| 7,638,896 B2 * | 12/2009 | Ozaki | ...... | 307/9.1 |
| 8,447,598 B2 * | 5/2013 | Chutorash et al. | ...... | 704/231 |
| 8,473,012 B2 * | 6/2013 | Varela et al. | ...... | 455/569.2 |

(Continued)

FOREIGN PATENT DOCUMENTS

| | | |
|---|---|---|
| EP | 2204638 | 7/2010 |
| TW | M308880 | 4/2007 |

(Continued)

OTHER PUBLICATIONS

"Introducing the Parrot Bluetooth Car Kit", RevoZport racing technology ltd., 2008.*

(Continued)

*Primary Examiner* — Helal A Algahaim
*Assistant Examiner* — Donald J Wallace
(74) *Attorney, Agent, or Firm* — Jianq Chyun IP Office

(57) ABSTRACT

A method, a handheld electronic apparatus, and a car system for activating an application are provided. The handheld electronic apparatus obtains identification information from a car apparatus when the handheld electronic apparatus is connected to the car apparatus. Herein, the car apparatus is coupled to a power connection unit of a vehicle. The handheld electronic apparatus activates an application corresponding to the identification information after obtaining the identification information.

19 Claims, 3 Drawing Sheets

(56) References Cited

U.S. PATENT DOCUMENTS

| | | | |
|---|---|---|---|
| 8,548,532 B1* | 10/2013 | Ng | 455/569.1 |
| 2004/0214525 A1* | 10/2004 | Ahn et al. | 455/41.2 |
| 2008/0133082 A1* | 6/2008 | Rasin et al. | 701/36 |
| 2009/0186576 A1* | 7/2009 | Peng | 455/41.2 |
| 2010/0223006 A1* | 9/2010 | Sasaki | 701/209 |

FOREIGN PATENT DOCUMENTS

| | | |
|---|---|---|
| TW | 201117982 | 6/2011 |
| WO | 2005004431 | 1/2005 |

OTHER PUBLICATIONS

"Search Report of European Counterpart Application", issued on Nov. 8, 2013, p. 1-p. 3.

"Office Action of Taiwan Counterpart Application", issued on Sep. 16, 2014, p. 1-p. 11.

"Office Action of Taiwan Counterpart Application", issued on Dec. 29, 2014, p. 1-p. 12.

* cited by examiner

METHOD FOR ACTIVATING APPLICATION, HANDHELD ELECTRONIC APPARATUS AND CAR SYSTEM

CROSS-REFERENCE TO RELATED APPLICATION

This application claims the priority benefits of U.S. provisional application Ser. No. 61/601,542, filed on Feb. 21, 2012. The entirety of the above-mentioned patent applications is hereby incorporated by reference herein and made a part of this specification.

BACKGROUND

1. Technical Field

The disclosure relates to a handheld electronic apparatus and an operation method thereof. Particularly, the disclosure relates to a method, a handheld electronic apparatus, and a car system for automatically activating application.

2. Related Art

In recent years, along with quick development of technology industry, electronic products such as mobile phones, tablet computers, notebook computers, and smart phones, etc. are widely used, and are developed to be convenient in usage, multi functional and elegant in appearance, so as to provide users more choices.

Since functions of the mobile devices are gradually increased, the mobile devices are indispensable in peoples' daily life. For example, taking a driving process as an example, drivers gradually rely on a calling function or a positioning function of the mobile device in order to keep contacting to others or sending messages while driving. Therefore, a car kit capable of fixing the mobile device relative to the vehicle becomes car equipment facilitating the driver's usage. Moreover, in the vehicle, the electronic products can be connected to different devices such as a Bluetooth dongle to execute extra applications such as music playing, etc. to increase usability of the electronic product.

SUMMARY

The disclosure is directed to a method for activating application, a handheld electronic apparatus and a car system, by which usage convenience is improved.

The disclosure provides a method for activating application, which includes following steps. A handheld electronic apparatus is connected to a car apparatus, wherein the car apparatus is coupled to a power connection unit of a vehicle. The handheld electronic apparatus obtains identification information from the car apparatus when the handheld electronic apparatus is connected to the car apparatus. The handheld electronic apparatus automatically activates an application corresponding to the identification information.

The disclosure provides a handheld electronic apparatus including a connection unit and a processing unit. The connection unit is connected to the car apparatus, where the car apparatus is coupled to a power connection unit of a vehicle. The processing unit is coupled to the connection unit. The processing unit obtains identification information from the car apparatus when the connection unit is connected to the car apparatus, and automatically activates an application corresponding to the identification information.

The disclosure provides a car system including a handheld electronic apparatus and a car apparatus. The handheld electronic apparatus includes a first connection unit and a processing unit, where the processing unit is coupled to the first connection unit. The car apparatus is coupled to a power connection unit of a vehicle and has a second connection unit. After an engine of the vehicle is started and power is supplied to the car apparatus through the power connection unit, the processing unit obtains identification information from the car apparatus when the first connection unit is connected to the second connection, and automatically activates an application corresponding to the identification information.

According to the above descriptions, the user only needs to connect the handheld electronic apparatus with the car apparatus, and the handheld electronic apparatus can automatically activate the corresponding application, which saves a time for finding the application, and is convenient in usage, so as to achieve a better driving experience.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

First embodiment

Figure 1:
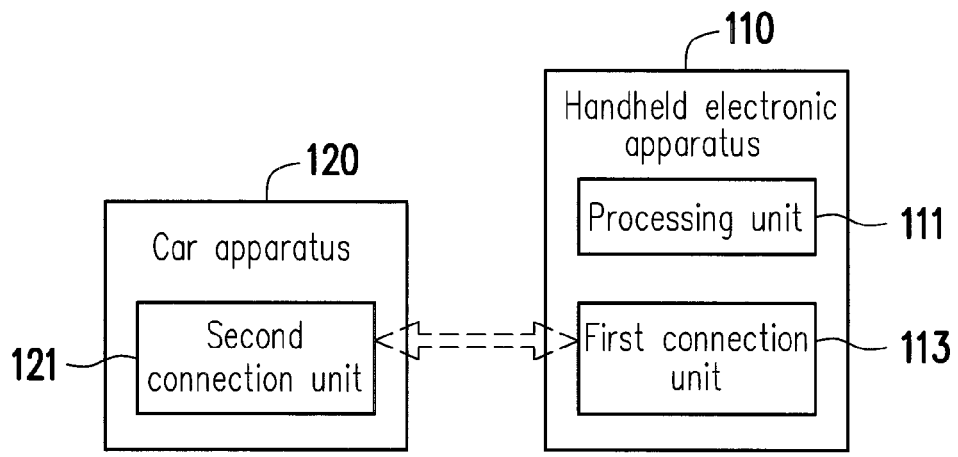
FIG. 1 is a schematic diagram of a car system according to a first embodiment of the disclosure.

FIG. 1 is a schematic diagram of a car system according to the first embodiment of the disclosure. Referring to FIG. 1, in the present embodiment, the car system includes a handheld electronic apparatus 110 and a car apparatus 120. Here, the handheld electronic apparatus 110 includes a processing unit 111 and a first connection unit 113. The car apparatus 120 has a second connection unit 121.

The car apparatus 120 is, for example, a car kit or a wireless dongle, etc. The car apparatus 120 may be directly installed on the vehicle, or detachably installed on the vehicle. The car apparatus 120 is coupled to a power connection unit of the vehicle (for example, a cigarette lighter hole on the front panel of the vehicle).

The handheld electronic apparatus 110 may be, for example, a mobile phone, a smart phone, a tablet computer, a navigation device, etc. The handheld apparatus 110 may be connected to the car apparatus 120 through a wired or wireless manner. The first connection unit 113 of the handheld electronic apparatus 110 is connected to the second connection unit 121 of the car apparatus 120. Under the circumstances that the handheld electronic apparatus 110 is connected to the car apparatus 120, the processing unit 111 may obtain identification information from the car apparatus 120, and automatically activate an application corresponding to the identification information.

Figure 2:
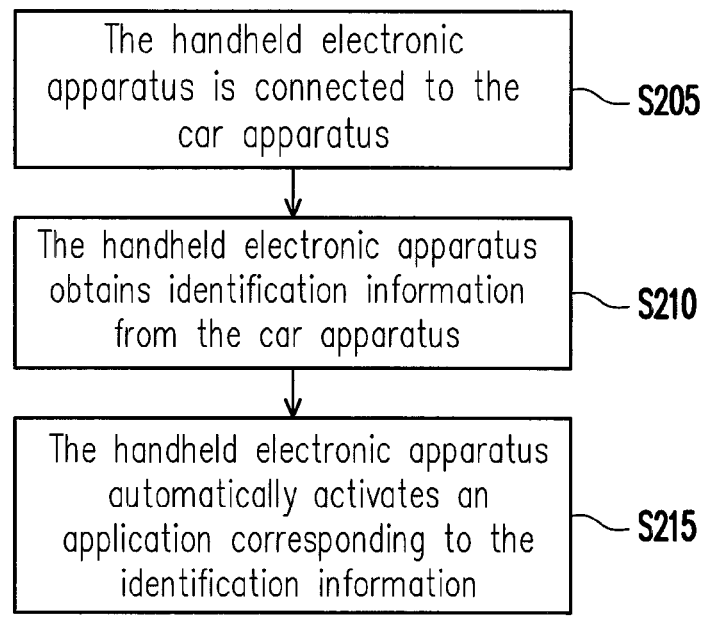
FIG. 2 is a flowchart illustrating a method for activating application according to the first embodiment of the disclosure.

Steps of the method for activating the application program are described below with reference of the aforementioned car system. FIG. 2 is a flowchart illustrating a method for activating application according to the first embodiment of the disclosure. Referring to FIG. 1 and FIG. 2, in step S205, the handheld electronic apparatus 110 is connected to the car apparatus 120. For example, the first connection unit 113 is connected to the second connection unit 121 through a wired or wireless manner.

Then, in step S210, under the circumstances that the handheld electronic apparatus 110 is connected to the car apparatus 120, the handheld electronic apparatus 110 obtain identification information from the car apparatus 120. For example, after the handheld electronic apparatus 110 is connected to the car apparatus 120, the processing unit 111 of the handheld electronic apparatus 110 can automatically read the identification information of the car apparatus 120. For another example, after the handheld electronic apparatus 110 is connected to the car apparatus 120, the car apparatus 120 automatically transmits the identification information to the processing unit 111 of the handheld electronic apparatus 110.

After the identification information is obtained, in step S215, the processing unit 111 of the handheld electronic apparatus 110 automatically activates an application corresponding to the identification information. For example, the identification information is a model number of the car apparatus 120. For example, it is assumed that mapping information of the car apparatus 120 has been established in the handheld electronic apparatus 110 in advanced, and when the handheld electronic apparatus 110 obtains the identification information, the handheld electronic apparatus 110 can automatically inquiry the mapping information to activate the corresponding application.

Second Embodiment

Figure 3:
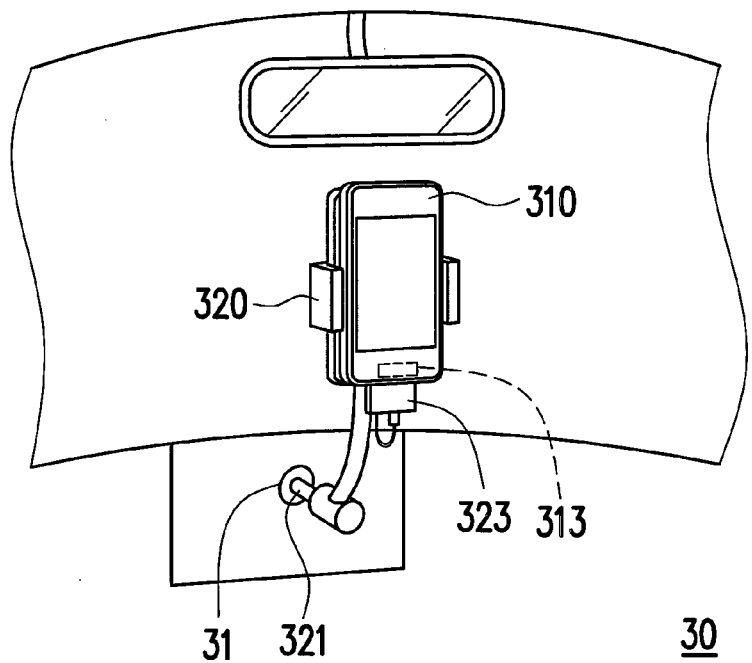
FIG. 3 is a schematic diagram of a car system according to a second embodiment of the disclosure.

FIG. 3 is a schematic diagram of a car system according to the second embodiment of the disclosure. The present embodiment is one of applications of the first embodiment. In the present embodiment, a handheld electronic apparatus 310 is, for example, a smart phone, and a first connection unit 313 is, for example, a fitting unit. A car apparatus 320 is, for example, a car kit, and the car apparatus 320 further includes an adapter unit 321 and a second connection unit 323, wherein the second connection unit 323 is, for example, a fitting unit corresponding to the first connection unit 313.

In the present embodiment, the car apparatus 320 is detachably coupled to a power connection unit 31 of a vehicle 30 through the adapter unit 321. Moreover, in other embodiments, the car apparatus 320 may also be directly disposed in the vehicle 30 and is directly coupled to the power connection unit 31 of the vehicle.

Figure 4:
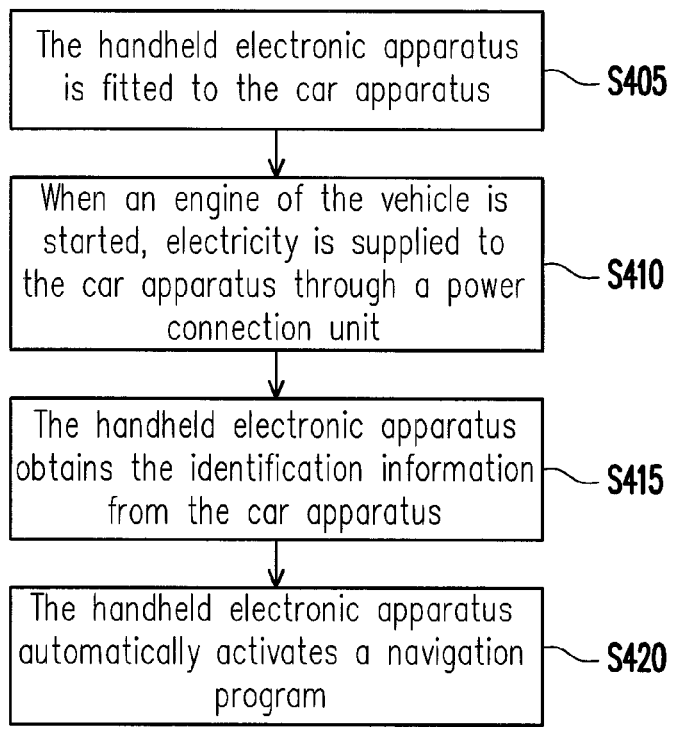
FIG. 4 is a flowchart illustrating a method for activating application according to the second embodiment of the disclosure.

Steps of the method for activating application program are described below with reference of the aforementioned car system. FIG. 4 is a flowchart illustrating a method for activating application according to the second embodiment of the disclosure. Referring to FIG. 3 and FIG. 4, in step S405, the first connection unit 313 of the handheld electronic apparatus 310 is fitted to the second connection unit 323 of the car apparatus 320. Namely, the handheld electronic apparatus 310 is fitted to the car apparatus 320.

In step S410, when an engine of the vehicle 30 is started, the power connection unit 31 supplies electricity to the car apparatus 320. Namely, the car apparatus 320 is coupled to the power connection unit 31 of the vehicle 30 through the adapter unit 321, so as to receive the electrical energy provided by the vehicle 30. Moreover, in other embodiments, the step S410 may be executed first, and then the step S405 is executed, which is not limited by the disclosure.

After the engine of the vehicle 30 is started and the power connection unit 31 supplies electricity to the car apparatus 320, the handheld electronic apparatus 310 is automatically connected to the car apparatus 320, and under the circumstances that the handheld electronic apparatus 310 is connected to the car apparatus 320, in step S415, the handheld electronic apparatus 310 automatically obtains identification information from the car apparatus 320. Here, the identification information includes a hardware serial number or other identification codes. For example, the handheld electronic apparatus 310 reads the identification information from the car apparatus 320 through a line between the first connection unit 313 and the second connection unit 323. For another example, the car apparatus 320 transmits the identification information to the handheld electronic apparatus 310 through the line between the first connection unit 313 and the second connection unit 323.

After the handheld electronic apparatus 310 obtains the identification information, in step S420, the handheld electronic apparatus 310 automatically activates a navigation program. Namely, when the handheld electronic apparatus 310 detects that it is fitted to the car apparatus 320, and the engine of the vehicle 30 is started, the handheld electronic apparatus 310 automatically activates the navigation program. Moreover, the navigation program may record a route planned during the previous activation, so that when the navigation program is again activated, it may directly display a previously planned route or a route list. In another embodiment, when the handheld electronic apparatus 310 obtains the identification information, the handheld electronic apparatus 310 does not automatically activate the navigation program, and after the user activates the navigation program, the navigation program directly displays the previously planned route or the route list according to the identification information. In other embodiments, the user can also set or change the application of the car apparatus 320 to other application such as a driving recorder or a music player, etc.

Third Embodiment

Figure 5:
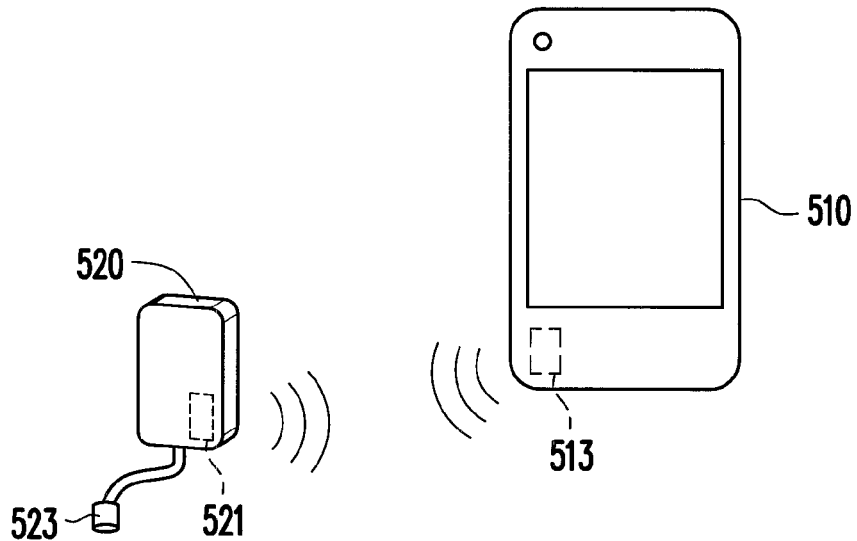
FIG. 5 is a schematic diagram of a car system according to a third embodiment of the disclosure.

FIG. 5 is a schematic diagram of a car system according to a third embodiment of the disclosure. The present embodiment is one of applications mode of the first embodiment. In the present embodiment, a handheld electronic apparatus 510 is, for example, a smart phone configured with a first wireless communication unit 513. The car apparatus 520 is, for example, a dongle configured with an adapter unit 523 and a second wireless communication unit 521. The dongle is, for example, a Bluetooth dongle, a Bluetooth earphone, or a wireless fidelity (WiFi) transmitter.

In the present embodiment, the car apparatus 520 is detachably coupled to the power connection unit (not shown) of the vehicle through the adapter unit 523. Moreover, in other embodiments, the car apparatus 520 can be directly disposed in the vehicle.

Figure 6:
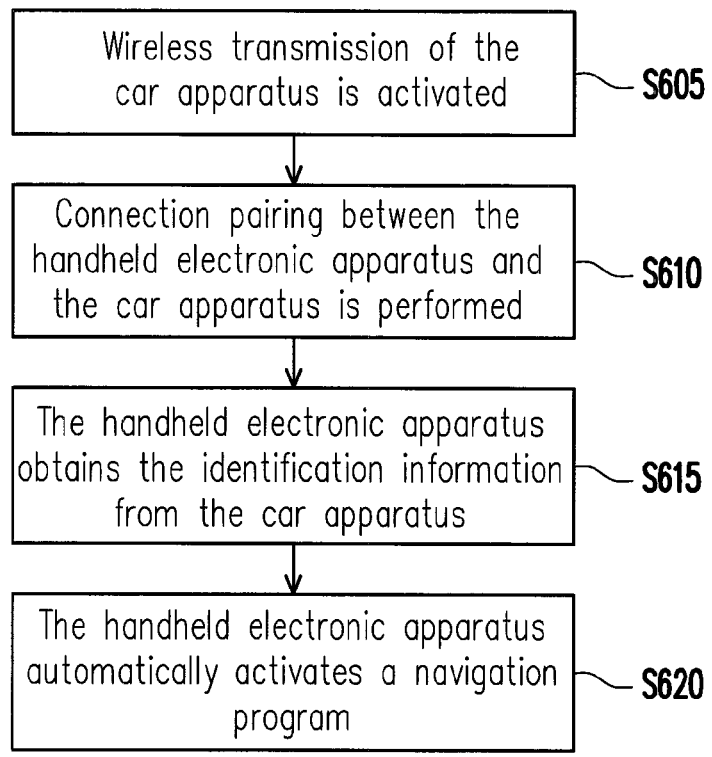
FIG. 6 is a flowchart illustrating a method for activating application according to the third embodiment of the disclosure.

Steps of the method for activating the application program are described below with reference of the aforementioned car system. FIG. 6 is a flowchart illustrating a method for activating application according to the third embodiment of the disclosure. Referring to FIG. 5 and FIG. 6, in step S605, wireless transmission of the car apparatus 520 is activated. Namely, the second wireless communication unit 521 of the car apparatus 520 is activated.

Then, in step S610, connection pairing between the handheld electronic apparatus 510 and the car apparatus 520 is performed. For example, it is assumed that the first wireless communication unit 513 and the second wireless communication unit 521 are Bluetooth devices, when the second wireless communication unit 521 of the car apparatus 520 is enabled, the connection pairing can be performed between the first wireless communication unit 513 of the handheld electronic apparatus 510 and the second wireless communication unit 521. Moreover, in other embodiments, when the engine of the vehicle is started, the power connection unit supplies electricity to the car apparatus 520, so that under the circumstances that electricity is supplied to the car apparatus 520, the connection pairing between the first wireless communication unit 513 of the handheld electronic apparatus 510 and the second wireless communication unit 521 is performed.

Then, in step S615, the handheld electronic apparatus 510 obtains identification information from the car apparatus 520. Here, the identification information is, for example, Bluetooth pairing information, and in other embodiments, the identification information may also be a hardware serial number or other identification codes. For example, after the handheld electronic apparatus 510 obtains the identification information, in step S620, the handheld electronic apparatus 510 automatically activates a multimedia player. Moreover, a music player (multimedia player) in the handheld electronic apparatus 510 may record a music playing list, and when the music player is automatically activated according to the aforementioned steps S605-S620, the music player automatically follows a last played music track to continue playing music. Alternatively, if the user listened to a radio program at the last time other than playing music, the handheld electronic apparatus 510 can automatically play a program of the radio station recorded at the last time. Moreover, in another embodiment, if the handheld electronic apparatus 510 is a smart phone, and the user connects the handheld electronic apparatus 510 with a car kit after entering the vehicle, the handheld electronic apparatus 510 automatically changes from a smart phone user interface into a car mode user interface, and now the automatically activated music player or radio receiving program is automatically changed to a car mode music player or radio receiving program, and the car mode music player or the radio receiving program have the car mode user interface suitable for being used by the user in a driving process.

In other embodiments, the user can also set or change the application corresponding to the car apparatus 520 to a radio player or other multimedia player. Alternatively, if the car apparatus 520 is a Bluetooth receiver, after the handheld electronic apparatus 510 is connected to the car apparatus 520, the handheld electronic apparatus 510 automatically activates a handsfree function, which is only an example, and is not used to limit the disclosure.

In summary, the user only needs to connect the handheld electronic apparatus with the car apparatus, and the handheld electronic apparatus can automatically activate the corresponding application, which saves a time for finding the application, and is convenient in usage. Moreover, when the user starts the engine of the vehicle or enables the wireless communication transmission, the handheld electronic apparatus automatically activates the corresponding application, so as to achieve a better driving experience.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for activating an application of a handheld electronic apparatus, comprising:
    connecting to a car apparatus, wherein the car apparatus is coupled to a power connection unit of a vehicle;
    obtaining identification information from the car apparatus when the handheld electronic apparatus is connected to the car apparatus; activating a multimedia player application;
    storing information corresponding to the activating of the multimedia player application;
    disconnecting with the car apparatus;
    re-connecting to the car apparatus; and
    automatically inquiring mapping information to activate the multimedia player application corresponding to the identification information according to the stored information corresponding to the activating of the multimedia player application in the mapping information.

2. The method as claimed in claim 1, wherein after the car apparatus receives electricity from the power connection unit after an engine of the vehicle is started, the handheld electronic apparatus is automatically connected to the car apparatus, and automatically obtains the identification information from the car apparatus.

3. The method as claimed in claim 1, wherein the step of connecting the car apparatus comprises:
    coupling the car apparatus through a fitting unit.

4. The method as claimed in claim 1, wherein the step of connecting the car apparatus comprises:
    performing connection pairing between a first wireless communication unit of the handheld electronic apparatus and a second wireless communication unit of the car apparatus.

5. The method as claimed in claim 1, wherein after the multimedia player application is automatically activated after re-connecting to the car apparatus, the method further comprises automatically playing a music track according to the stored information corresponding to the activating of the multimedia player application in the mapping information.

6. The method as claimed in claim 1, wherein after the multimedia player application is automatically activated after re-connecting to the car apparatus, the method further comprises automatically playing a radio program according to the stored information corresponding to the activating of the multimedia player application in the mapping information.

7. The method as claimed in claim 1, wherein the handheld electronic apparatus is a smart phone, the car apparatus is a car kit, and after the handheld electronic apparatus is connected to the car apparatus, a user interface of the handheld electronic apparatus is automatically changed to a car mode user interface, and the multimedia player application is a car mode multimedia player having the car mode user interface.

8. A handheld electronic apparatus, comprising:
    a connection unit, connected to a car apparatus, wherein the car apparatus is coupled to a power connection unit of a vehicle; and
    a processing unit, coupled to the connection unit,
    wherein the processing unit obtains identification information from the car apparatus when the connection unit is connected to the car apparatus, activates a multimedia player application, and stores information corresponding to the activating of the multimedia player application, wherein when the connection unit is re-connected to the car apparatus after the connection unit is disconnected with the car apparatus, the processing unit automatically inquires mapping information to activate the multimedia player application corresponding to the identification information according to the stored information corresponding to the activating of the multimedia player application in the mapping information.

9. The handheld electronic apparatus as claimed in claim 8, wherein after the car apparatus receives electricity from the power connection unit after an engine of the vehicle is started, the connection unit is automatically connected to the car apparatus, and the processing unit automatically obtains the identification information from the car apparatus.

10. The handheld electronic apparatus as claimed in claim 8, wherein the connection unit is a fitting unit, the car apparatus is a car kit.

11. The handheld electronic apparatus as claimed in claim 8, wherein the connection unit is a first wireless communication unit, and the car apparatus is a dongle having a second wireless communication unit.

12. The handheld electronic apparatus as claimed in claim 11, wherein after the multimedia player application is automatically activated after re-connecting to the car apparatus, the multimedia player application automatically plays a music track according to the stored information corresponding to the activating of the multimedia player application in the mapping information.

13. The handheld electronic apparatus as claimed in claim 11, wherein after the multimedia player application is automatically activated after re-connecting to the car apparatus, the multimedia player application automatically plays a radio program according to the stored information corresponding to the activating of the multimedia player application in the mapping information.

14. The handheld electronic apparatus as claimed in claim 11, wherein the handheld electronic apparatus is a smart phone, the car apparatus is a car kit, and after the handheld electronic apparatus is connected to the car apparatus, a user interface of the handheld electronic apparatus is automatically changed to a car mode user interface, and the multimedia player is a car mode multimedia player having the car mode user interface.

15. A car system, comprising:
a handheld electronic apparatus, comprising:
a first connection unit; and
a processing unit, coupled to the first connection unit; and
a car apparatus, coupled to a power connection unit of a vehicle, and having a second connection unit,
wherein after an engine of the vehicle is started and electricity is supplied to the car apparatus through the power connection unit, the processing unit obtains identification information from the car apparatus when the first connection unit is connected to the second connection unit, and the processing unit of the handheld electronic apparatus activates a multimedia player application and stores information corresponding to the activating of the multimedia player application,
wherein when the first connection unit is re-connected to the second connection after the first connection unit is disconnected with the second connection, the processing unit of the handheld electronic apparatus automatically inquires mapping information to activate the multimedia player application corresponding to the identification information according to the stored information corresponding to the activating of the multimedia player application in the mapping information.

16. The car system as claimed in claim 15, wherein the first connection unit is a first wireless communication unit, and the car apparatus is a dongle having a second wireless communication unit.

17. The car system as claimed in claim 15, wherein after the multimedia player application is automatically activated after re-connecting to the car apparatus, the multimedia player application automatically plays a music track according to the stored information corresponding to the activating of the multimedia player application in the mapping information.

18. The car system as claimed in claim 15, wherein after the multimedia player application is automatically activated after re-connecting to the car apparatus, the multimedia player application automatically plays a radio program according to the stored information corresponding to the activating of the multimedia player application in the mapping information.

19. The car system as claimed in claim 15, wherein the handheld electronic apparatus is a smart phone, the car apparatus is a car kit, and after the handheld electronic apparatus is connected to the car apparatus, a user interface of the handheld electronic apparatus is automatically changed to a car mode user interface, and the multimedia player is a car mode multimedia player having the car mode user interface.

* * * * *